United States Patent [19]

Ribba

[11] 3,966,687
[45] June 29, 1976

[54] ACRYLIC COPOLYMERS
[75] Inventor: Alain Ribba, Chateaurenault, France
[73] Assignee: Manufacture de Produits Chimiques Protex, Paris, France
[22] Filed: Feb. 6, 1974
[21] Appl. No.: 440,270

[30] Foreign Application Priority Data
Feb. 16, 1973  France .............................. 73.05668

[52] U.S. Cl. .................... 526/317; 260/29.6 TA; 260/29.6 PM; 260/29.7 R; 526/319; 526/338
[51] Int. Cl.² ............... C08F 220/06; C08F 222/28; C08F 230/02; C08F 230/08
[58] Field of Search ................. 260/80.71, 78.5 UA, 260/80.7

[56] References Cited
UNITED STATES PATENTS 2,923,692  2/1960  Ackerman et al. ............... 260/17.4
2,962,471  11/1960  Lang et al. ......................... 260/45.4
3,617,362  11/1971  Bemmels et al. .................. 117/122

Primary Examiner—John Kight, III
Attorney, Agent, or Firm—Browdy and Neimark

[57] ABSTRACT

New copolymers obtained by interpolymerization of alkylacrylate (25 to 85 %), methacrylic acid (15 to 75 %), trialkyloxyvinylsilane (0.1 to 2 %) and monomer acting as reticulating agent, for example: divinylbenzene, alkyl compound, etc. (0.01 to 0.5 %). The above indicated percentages are in weight of the total monomer mixture.

These copolymers are used, in form of emulsions, as thickening agents for aqueous systems of polymers, for example of acrylic copolymers.

5 Claims, No Drawings

ACRYLIC COPOLYMERS

The present invention concerns new acrylic copolymers usable, in form of emulsions, as thickening agents in aqueous medium.

It has already been proposed to use acrylic copolymers for thickening aqueous media by giving them a proper viscosity. Polyacrylates or polymethacrylates of alkaline salts (e.g., sodium salts) obtained by polymerization of the corresponding monomeric acids in aqueous solution, followed by neutralization by a base such as Na OH or $NH_4$ OH, or by basic hydrolysis of a powdery polyacrylonitrile or a polyacrylate of a lower alkyl has long been used. The aqueous solutions obtained from those polymers were viscous and required a 5 to 10 % maximum solution to be able to be handled. Furthermore these solutions had to be stored at a low concentration in order to facilitate the later drying, which required providing for dilution operations and required large quantities of storing vessels.

The later use of aqueous emulsions of acrylic copolymers has brought about a significant improvement. For instance, emulsions have been manufactured and marketed which were obtained by copolymerization of acrylic and/or methacrylic acid with acrylic and/or methacrylic esters in the present of one or several monomers having one or more ethylenic double bonds, the said emulsions permitting the thickening of aqueous solutions in situ, starting from products having a solid residue of 20 to 40 % in weight.

However, the viscosity which can be obtained with such polymers is limited due to the fact that beyond a given percentage of monomers with several ethylenic double bonds, the polymers are too reticulated and the chains can no longer unfold during neutralization by a base in aqueous medium. The viscosity thus obtained for the aqueous solutions of those acrylic copolymers is then lower than with less reticulated polymers.

Now it has been discovered that, surprisingly, the presence of a small percentage of vinylsilanes in the acrylic comonomers customarily used to obtain thickening polymers, permits one to overcome the above mentioned drawbacks and to obtain new copolymers whose viscosity, in the form of aqueous solutions, is significantly higher than that of the known acrylic polymers without Si—O—Si bonds, and which can be easily handled when used as thickening agents, owing to their moderate reticulation rate.

An object of the present invention is therefore to provide new copolymers acrylic-based containing silicic monomers. The polymers according to the invention are obtained by interpolymerization, according to the known art, of:

a. at least one alkylacrylate, the alkyl portion of which contains 1 to 8 carbon atoms, representing 25 to 85 % in weight of the mixture of monomers (a) to (d).

b. the methacrylic acid, constituting 15 to 75 % in weight of the mixture of monomers (a) to (d).

c. a trialkyloxyvinylsilane of general formula:

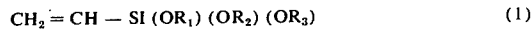

wherein $R_1$, $R_2$, and $R_3$, which can be identical or different, can be either a lower alkyl group, linear or ramified, or an alkyloxyalkyl group, wherein the alkyl portion is defined as above. The percentage of (c) is between 0.1 and 2 % in weight of the mixture of monomers (a) to (d).

d. at least one monomer having at least two ethylenic double bonds, which can be copolymerized with monomers (a) to (c), the pecentage of which is 0.01 to 0.5 % in weight of the total monomer mixture.

Regarding monomers (a), the methyl-, butyl-, isobutyl-, ethyl-2 hexyl-acrylates can be selected, and also especially the ethylacrylate.

The trialkyloxyvinylsilanes according to formula (1), which are obtained by the known method of alcoholysis of the vinyltrichlorosilane in presence of the proper catalyst, can, for example, be selected among the compounds in which:

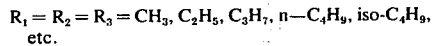

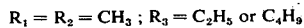

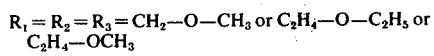

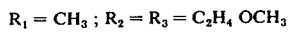

The monomer or monomers having ethylenic double bonds may be vinylic componds such as, for example, the divinylbenzene, or allylic compounds such as, namely: diallylphthalate, triallylphosphate, triallylcyanurate, ethyleneglycoldimethacrylate, trimethylolpropanetrimethacrylate, diallylmaleate or fumarate, tehaallyloxetane, etc. As a rule, all the unsaturated monomers known as reticulating agents for acrylic monomers and comonomers are suitable to prepare the copolymers according to the invention.

The interpolymers according to the invention are obtained by polymerization in aqueous emulsion, in presence of an emulsifying agent and a free radical initiator or catalyst of the Redox type, according to well-known methods. As an initiator, one can use, for example, a peroxide, such as the benzoylperoxide or tertiobutylperoxide, a persalt such as an alkaline persulphate or percarbonate. The Redox system can be a combination of alkaline persulphate and bisulphite, or alkaline bromate and sulphite or of an alkaline persulphate with a tertiary amine. As emulsifying agents, one can use, with a percentage of 2 to 6 % of the total weight of monomers, anionic type products such as alkaline laurylsulphates, sulphonates, alkaline, alkyl -(or aryl-) sulphonates, alkylphenolphosphates, or non-ionic emulsifiers such as polyoxylalkylene-polyolethers, or alkylphenolethers, mono-, di- or tri-esters of fatty acids or polyalkylenepolyols, etc. Mixtures of anionic and non-ionic products can also be used.

In practice, polymerization can be made by continuously introducing the monomers into an emulsified aqueous solution, to which the catalyst has been added, and the temperature of which lies between 70° and 90°C. Alternatively, the monomers and catalyst can be continuously added to the hot aqueous solution containing the emulsifier. According to another method, the monomers, in the form of an aqueous solution containing the emulsifier, can be introduced, all at once or continuously, into the reaction vessel containing the balance of water required by the polymerization, wherein the catalyst has been dissolved. After being agitated for half an hour to 2 hours at the above mentioned temperature, the reacting mass is cooled down, and the copolymer is obtained in form of a fine emulsion with a polymer concentration between generally 20 and 40 % (dry solids).

According to a further object of the invention, the new copolymers are used as thickening agents for aqueous systems by neutralization by means of a base such as, for example, an aqueous solution of ammonia — or sodium hydroxide. The polymer becomes soluble in water at a pH value which varies according to the quantity of polymethacrylic acid which it contains generally between pH values of 6.5 to 9, and transforms, as the solubilization progresses, into a lineocolloid which acts as a thickening agent for the surrounding aqueous medium.

Among the many aqueous systems to which the polymers according to the invention can be added, the following can be mentioned: emulsions of acrylic, styrenic polymers, or synthetic latex such as butadiene-styrene or acrylonitrile-butadiene-styrene copolymers, aqueous compositions for papers, leathers adhesives and glues, textiles, aqueous paints, aqueous suspensions of pigments, cosmetics, leathers, etc.

The percentages of polymers to be added to the aqueous medium are obviously a function of the required final viscosity and the respective percentages of the monomers which have been used to prepare the interpolymers according to the invention. They lie however generally between 0.5 and 5 parts per 100 parts in weight of the aqueous composition to be thickened.

The following examples illustrate, in a non-limiting fashion, how the invention can be put to practice. Example 1 concerns preparation of quaternary interpolymers. Examples 2 to 27 illustrate the influence on the increase in final viscosity of the presence of the vinylsilane monomer in the copolymers (examples 2 to 8), of monomers having at least two ethylenic double bonds (examples 9 to 15) and show the optimum ranges of percentage of vinylsilane and double bond monomers to obtain the required high viscosity (examples 16 to 27). Examples 28 to 35 illustrate the viscosity characteristics of another series of quaterpolymers according to the invention. Finally example 36 concerns the use of copolymers according to the invention as thickeners, compared to a reference emulsion of acrylic copolymers without vinylsilane.

EXAMPLE 1

In a cylindrical 2 liter vessel made of Pyrex and comprising an agitator, a thermometer and a dropping funnel, 657 grams of deionized water and 4.5 grams of sodiumlaurylsulphate are introduced. After solubilization, the vessel is heated up to 80°–83°C and 6.75 ml of an aqueous solution at 10 % of ammonium persulphate are added. Then there is progressively added the monomer mixture which was previously loaded in the funnel, namely: 162 grams of ethylacrylate, 108 grams of methacrylic acid, 2.7 grams of vinyltriethoxysilane and 0.135 grams of triallylphosphate. The addition is made in 1½ hour to 2 hours at 85°–88°C. When the addition is completed, 2 ml of a 10 % aqueous solution of ammonium persulphate are added, and the temperature is further maintained at 88°–90°C for an hour to complete the polymerization. After cooling down, the vessel contents are filtered and there is then obtained a fine particle emulsion, substantially without any precipitate, and with a 29 % concentration of a copolymer having the following composition (expressed in weight).
ethylacrylate: 60
methacrylic acid: 40
vinyltriethoxysilane: 1
triallyphosphate: 0.05

This emulsion is then diluted to obtain a 1 % concentration in water, and the viscosity is measured as a function of pH by means of a Brookfield viscosimeter (RV3 mobile) at 20°C, while the emulsion is being neutralized by an aqueous solution of ammonia. For a RV3 mobile speed of 10, the following results were obtained:

| PH | viscosity (centipoises) |
|---|---|
| 6 | 550 |
| 6.4 | 3000 |
| 7 | 3900 |
| 8 | 4000 |
| 9 | 3900 |

By way of comparison, commercial emulsion of acrylic copolymer, made of ethylacrylate, methacrylic acid and diallylphosphate (with proportions in weight respectively of 60, 40 and 0.2) has a maximum viscosity of 3000 centipoises for a pH of 7 to 7.5, under the same conditions.

EXAMPLES 2 to 27

With a view to emphasizing the influence of various monomers on the after-neutralization viscosity, a series of copolymers were synthetized using the same operating method as described in Example 1. The monomer relative percentages were varied, then the copolymer emulsions were diluted to obtain a 1 % solid matter concentration in water, neutralized by an aqueous solution of NH$_4$OH, and the maximum viscosity of the products so obtained was measured.

Viscosity was measured at a temperature of 20°C by means of a Brookfield viscosimeter (RV3 mobile, speed 10).

The results are shown in Table 1 to be found at the end of the description.

By comparing these test results, it can be seen that the simultaneous presence of vinylsilane comonomers with a reticulating agent having an ethylenic double bond (examples 16 to 27) results in solutions having when neutralized higher viscosities than when the same monomers are used separately (examples 2 to 15): Of course, the relative percentages of the said comonomers have to be adequately adjusted.

Indeed, an excess of either or both said comonomers results in too reticulated copolymers, and the macromolecular chains cannot unfold when the solution is neutralized by a base. Besides, the solutions of such polymers are not limpid, which tends to show a lack of solubilization. A lack in the two monomers leads to not enough reticulated copolymers, the viscosity of which is consequently low.

Similar results were obtained by substituting for the triallyphosphate reticulating agents of the same type, such as diallylmaleate, diallylphthalate, ethyleneglycoldimethacrylate, triallylcyanurate, tetraallyloxetane.

EXAMPLES 28 to 35

A series of copolymers according to the invention were synthetized, using the same operating procedure as in Example 1. The nature and relative proportions of the monomers were varied. The results are shown in Table 2 herebelow.

Tests 28 to 33 were performed with the vinyltriethoxysilane corresponding to the formula:

Test 34 was conducted using the vinyltrimethoxysilane of formula:

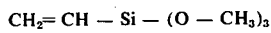

Test 35 was conducted using the vinyltrimethoxy ethoxysilane of formula:

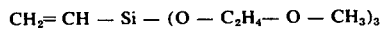

EXAMPLE 36

This example illustrates the use as a thickener of an emulsion of a quaterpolymer according to the invention, the composition of which is: Ethylacrylate (70) — Methacrylic acid (30) — Vinyltriethoxysilane (1) — Triallylphosphate (0.05). The proportions are in relative weights.

The products to be thickened were conventional emulsions of acrylic copolymers having 46 % of dry extract, which are used in textile industry and marketed by the assignee of the present application under the Tradename ACRYMUL, references 117R, 123R and 317R. The first two references correspond to anionic emulsions of an acrylic copolymer containing reactive groups and the third one to a non-ionic 100% acrylic dispersion. The physical and chemical properties of these references are given hereinbelow:

| | ACRYMUL 117R |
|---|---|
| Appearance | white milky liquid having blue reflection |
| Odor | slightly of monomers |
| Active Materials | 45 ± 1% |
| pH at 20°C | 5.5 ± 1 |
| Density at 20°C | 1.05 ± 0.1 |
| Viscosity at 20°C | 100 ± 10 cps |
| Chemical Stability | Good. The emulsion resists the addition of electrolytes such as aluminum sulfate or magnesium sulfate |
| Mechanical Stability at 20°C | Good |
| Freeze-Thaw Stability | Fear of freezing. |
| Storage Stability | Good |
| Thickening | The product thickens slightly in alkaline medium but the acrymul AM162s is best thickener. |
| Polarity | anionic |

| | ACRYMUL 123R |
|---|---|
| Appearance | White milky liquid having blue reflectivity |
| Odor | Very slightly of monomer |
| Active materials | 45 ± 2% |
| pH at 20°C | 6 ± 0.5 |
| Density at 20°C | 1.06 ± 0.05 |
| Viscosity at 20°C: (Haake TII,UM=1) | 75 ± 35 cps |
| Polarity | anionic |
| Chemical Stability | Excellent: the emulsion resists the addition of an equal weight of magnesium sulfate at 30%; it resists equally the addition of an equal weight of normal chlorhydric acid catalyst. |
| Mechanical Stability at 20°C | Excellent: the emulsion can be subjected to more than one hour at an agitation of 4000 t/min. without showing changes. |
| Freeze-Thaw Stability | Fears freezing. |
| Storage Stability | Good. |
| Thickening | The acrymul AM 123R thickens. |

| | ACRYMUL 317R |
|---|---|
| Appearance | White emulsion having a blue reflection. |
| Odor | Very slight. |
| Dry extract | 46 ± 2% |
| Density at 20°C | 1.055 ± 0.005 |
| Viscosity at 20°C | 750 cps (Haake UM 1) |
| pH at 20°C | 4.5 to 5.5 |
| Polarity | non-ionic |
| Chemical Stability | Excellent |
| Freeze-Thaw Stability | 0 cycle |
| Storage Stability at 20°C | Excellent |
| Mechanical Stability | Good |

2 grams of the quaterpolymer emulsion (with 28 % dry extract) were mixed up with 398 grams of each Acrymul, and the viscosity obtained at various pH's by neutralization by a solution of ammonia was measured under the same conditions as those described in reference to Example 1.

By way of comparison, the same tests were performed with an emulsion of an acrylic copolymer without vinylsilane, having the following composition (28 % of dry extract):

Ethylacrylate (60) — Methacrylic acid (40) — Diallylphthalate (0.2.).

The results are shown in Table 3 herebelow.

It appears that the introduction of the vinylsilane monomer into the known ternary mixture of monomers to obtain the polymers according to the invention, permits one to obtain emulsions which, after being neutralized by a base, constitute excellent thickeners for aqueous systems.

TABLE 1

| Example No. | Ethylacrylate | Methacrylic Acid | Vinyltriethoxysilane | Triallyl-phosphate | pH | Viscosity (cp) |
|---|---|---|---|---|---|---|
| 2 | 70 | 30 | 0 | 0 | 7.5 | 100 |
| 3 | 70 | 30 | 0.1 | 0 | 7.8 | 110 |
| 4 | 70 | 30 | 0.2 | 0 | 7.8 | 350 |
| 5 | 70 | 30 | 0.5 | 0 | 7.2 | 1150 |
| 6 | 70 | 30 | 1 | 0 | 7.8 | 2500 |
| 7 | 70 | 30 | 2 | 0 | 8 | 1200 |
| 8 | 70 | 30 | 5 | 0 | 8 | 50 |
| 9 | 70 | 30 | 0 | 0.050 | 7.5 | 350 |
| 10 | 70 | 30 | 0 | 0.075 | 7.5 | 1100 |
| 11 | 70 | 30 | 0 | 0.100 | 7.8 | 2300 |
| 12 | 70 | 30 | 0 | 0.125 | 7.9 | 1900 |
| 13 | 70 | 30 | 0 | 0.150 | 7.8 | 1200 |
| 14 | 70 | 30 | 0 | 0.200 | 7.8 | 800 |

TABLE 1-continued

| Example No. | Ethylacrylate | Methacrylic Acid | Vinyltriethoxysilane | Triallylphosphate | pH | Viscosity (cp) |
|---|---|---|---|---|---|---|
| 15 | 70 | 30 | 0 | 0.500 | 7.8 | 150 |
| 16 | 70 | 30 | 0.1 | 0.100 | 8 | 2500 |
| 17 | 70 | 30 | 0.5 | 0.05 | 8 | 3150 |
| 18 | 70 | 30 | 0.5 | 0.100 | 8 | 2950 |
| 19 | 70 | 30 | 1 | 0.050 | 7.2 | 4900 |
| 20 | 70 | 30 | 1 | 0.075 | 7.5 | 3900 |
| 21 | 70 | 30 | 1 | 0.100 | 7.5 | 3650 |
| 22 | 70 | 30 | 1 | 0.250 | 7.5 | 3000 |
| 23 | 70 | 30 | 1 | 0.500 | 7.8 | 200 |
| 24 | 70 | 30 | 2 | 0.025 | 7.5 | 3800 |
| 25 | 70 | 30 | 2 | 0.200 | 8 | 2200 |
| 26 | 70 | 30 | 2 | 0.500 | 8 | 100 |
| 27 | 70 | 30 | 2.5 | 0.100 | 8 | 150 |

TABLE 2

| Example No. | Ethylacrylate | Methacrylic Acid | Triallylphosphate | Vinylsilane | pH | Viscosity (cp) |
|---|---|---|---|---|---|---|
| 28 | 60 | 40 | 0.05 | 1.5 | 8 | 1500 |
| 29 | 60 | 40 | 0.05 | 1 | 8 | 4000 |
| 30 | 60 | 40 | 0.1 | 1 | 8 | 2500 |
| 31 | 60 | 40 | 0.1 | 0.5 | 8 | 2800 |
| 32 | 50 | 50 | 0.05 | 1 | 8 | 2000 |
| 33 | 70 | 30 | 0.05 | 2 | 8 | 3100 |
| 34 | 70 | 30 | 0.05 | 1 | 9.1 | 3400 |
| 35 | 70 | 30 | 0.05 | 1 | 8.5 | 2600 |

TABLE 3

| Mixture | Viscosity (centipoises) Brookfield RV | | | |
|---|---|---|---|---|
| | pH 7 | pH 7.5 | pH 8 | pH 8.5 |
| Acrymul 317 R + emulsion according to the invention | 280 | 5600 | 3800 | 4700 |
| Acrymul 317 R + reference emulsion | 200 | 900 | 1550 | 3700 |
| Acrymul 123 R + emulsion according to the invention | 120 | 250 | 680 | 1100 |
| Acrymul 123 R + reference emulsion | 50 | 100 | 200 | 300 |
| Acrymul 117 R + emulsion according to the invention | 400 | 2100 | 1300 | 43000 |
| Acrymul 117 R + reference emulsion | 140 | 1500 | 8800 | 30000 |

What is claimed is:

1. Copolymers obtained by interpolymerization of the following four monomers:
   a. at least one alkylacrylate, the alkyl portion of which contains 1 to 8 carbon atoms, at a weight percentage of 25 to 85% of the weight of the mixture of monomers (a) to (d),
   b. methacrylic acid, at a weight percentage of 15 to 75% of the weight of the mixture of monomers (a) to (d),
   c. a trialkyloxyvinylsilane corresponding to the general formula:

$$CH_2 = CH - Si (OR_1) (OR_2) (OR_3)$$

wherein $R_1$, $R_2$, $R_3$, which are identical or different, are either an alkyl group, linear or branched, or an alkyloxy-alkyl group wherein the alkyl portions are defined as above, at a weight percentage of 0.1 to 2% of the weight of the mixture of monomers (a) to (d), and
   d. at least one monomer having at least two ethylenic double bonds, which can be copolymerized with monomers (a) to (c), at a weight percentage of 0.01 to 0.5% of the weight of the total monomer mixture.

2. Copolymers according to claim 1, wherein the alkyl portion of acrylate (a) is selected from the group consisting of the methyl, ethyl, butyl, isobutyl, and ethyl-2 hexyl.

3. Copolymers according to claim 1, wherein radicals $R_1$, $R_2$, $R_3$ in the trialkyloxyvinylsilanes are such that:

$R_1 = R_2 = R_3 = C_2H_5, C_3H_9, nC_4H_9$ or $iso-C_4H_9$;

$R_1 = R_2 = CH_3$ and $R_3 = C_2H_5$ or $C_4H_9$;

$R_1 = R_2 = R_3 = CH_2-O-CH_3, C_2H_4-O-C_2H_5$ or $C_2H_4-O-CH_3$;

$R_1 = CH_3$ and $R_2 = R_3 = C_2H_4-O-CH_3$; or $R_1 = R_2 = C_2H_4-O-CH_3$ and $R_3 = C_2H_5$.

4. Copolymers according to claim 1, wherein monomer (d) is a reticulating agent selected from the group consisting of the following compounds: divinylbenzene, diallylphthalate, triallylphosphate, triallylcyanurate, ethyleneglycoldimethacrylate, trimethylolpropane-trimethacrylate, diallylmaleate, diallyfumarate, and tetrallyloxetane.

5. Copolymers according to claim 1 of a quaternary mixture of monomers comprising: 25 to 85 % of ethylacrylate, 15 to 75 % of methacrylic acid, 0.1 to 2 % of a vinylsilane selected from the group consisting of triethoxyvinylsilane, trimethoxyvinylsilane, and trimethoxyethoxyvinylsilane and 0.01 to 0.5 % of triallylphosphate, the percentages being expressed in weight, relative to the total weight of the four monomers.

* * * * *